United States Patent [19]
Sheeley et al.

[11] 3,787,283
[45] Jan. 22, 1974

[54] TREATMENT OF WASTE LIQUOR FROM PULP PRODUCTION

[75] Inventors: Donald R. Sheeley; James H. Rion; William R. Cook; William A. Biggs, Jr., all of Hartsville, S.C.

[73] Assignee: Sonoco Products Company, Hartsville, S.C.

[22] Filed: Mar. 28, 1972

[21] Appl. No.: 238,776

Related U.S. Application Data

[63] Continuation-in-part of Ser. No. 37,184, May 14, 1970, abandoned.

[52] U.S. Cl. ............... 162/36, 162/30, 162/240, 423/207
[51] Int. Cl. .................. D21c 11/02, D21c 11/12
[58] Field of Search 162/30, 36, 239, 240; 423/207, 423/121; 261/DIG. 54

[56] References Cited
UNITED STATES PATENTS

| | | | |
|---|---|---|---|
| 3,061,408 | 10/1962 | Lurie | 162/36 X |
| 2,734,796 | 2/1956 | Ashley et al. | 423/121 |
| 3,488,039 | 1/1970 | Ekman | 261/DIG. 54 |

Primary Examiner—Arthur D. Kellogg
Assistant Examiner—Alfred D'Andrea, Jr.
Attorney, Agent, or Firm—Warley L. Parrott et al.

[57] ABSTRACT

A process and apparatus for treating concentrated spent liquor from a soda-based pulping process to recover sodium for reuse in the pulping process and to prevent the usual pollution of streams and air caused by the usual effluent from the pulping process. The process and apparatus comprises the following steps and apparatus. Concentrated spent liquor containing sodium is mixed with recycled finely-divided reactive alumina hydrate and formed into solid pellets by spraying the concentrated liquor-aluminum hydrate mixture onto a bed of recycled sodium aluminate furnace ash in an enclosed rotating container and tumbling the mixture and ash. The solid pellets are combusted and reacted by feeding the pellets through a furnace operating at a temperature below the fusion temperature of sodium aluminate and at a sufficiently high temperature to combust the organic portion of the pellets and react the sodium content thereof with the alumina to form additional sodium aluminate as a particulate unfused ash. The resulting furnace ash is pulverized and a portion thereof is recycled for subsequent reuse in the treating process. The remaining portion of the ash is dissolved in water to form a solution of sodium aluminate. The sodium aluminate solution is reacted with either sulphur dioxide or carbon dioxide or both to form sodium sulfite and/or sodium carbonate pulping chemical and alumina and alumina is separated for reuse in the treating process.

9 Claims, 4 Drawing Figures

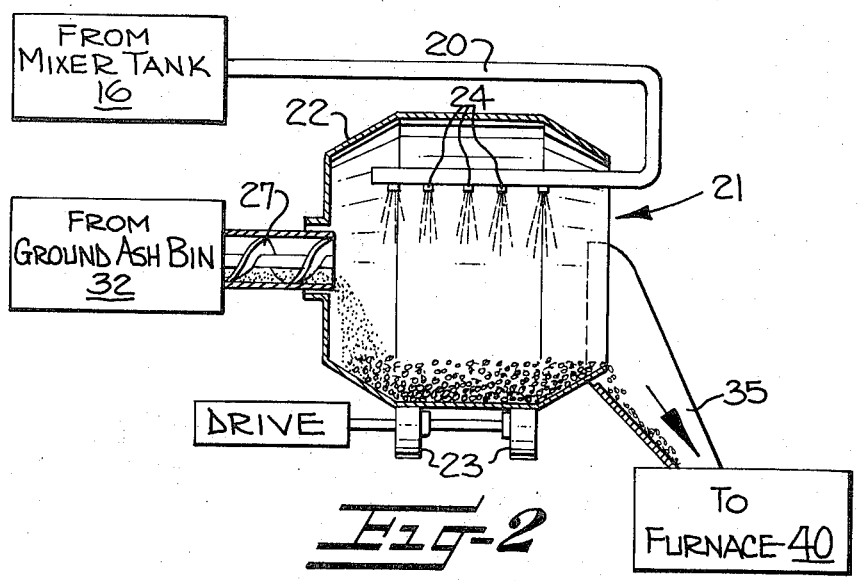
Fig-2
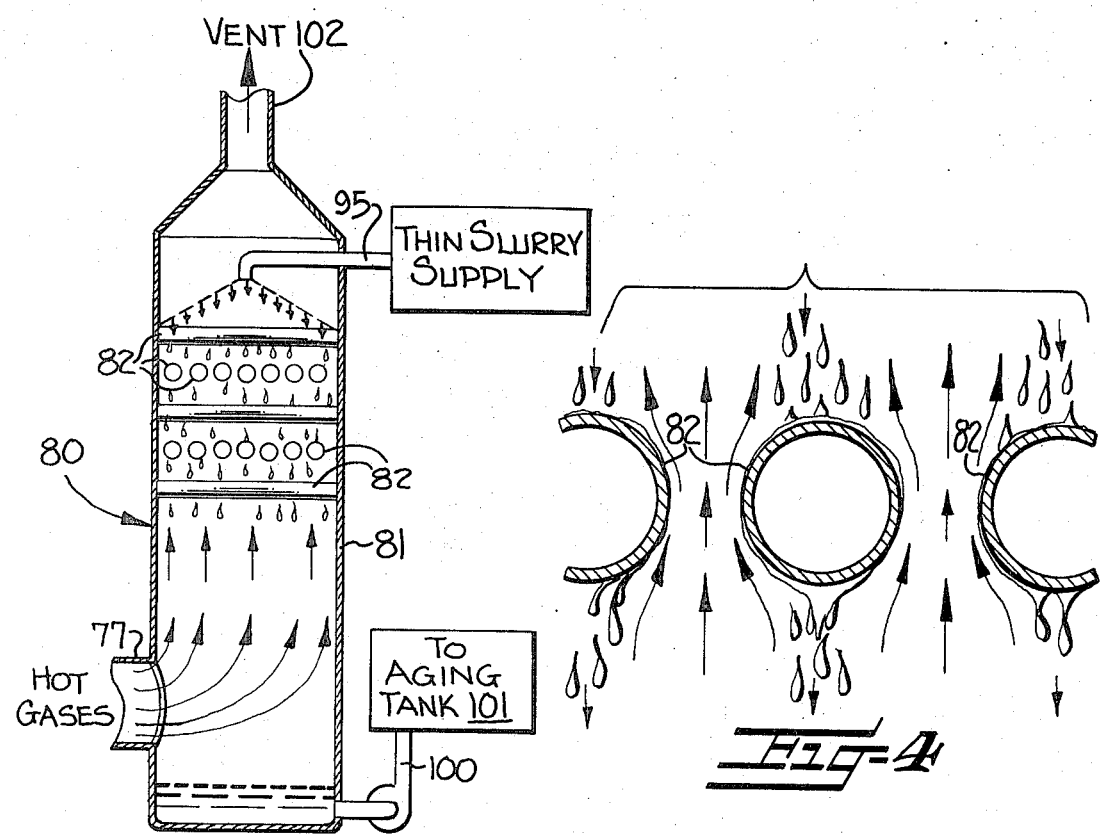
Fig-3
Fig-4

TREATMENT OF WASTE LIQUOR FROM PULP PRODUCTION

This application is a continuation-in-part of Ser. No. 37,184, filed May 14, 1970, now abandoned.

This invention relates to a process and apparatus for treatment of waste liquor from pulping processes and more particularly to treating concentrated spent liquor from a soda-based pulping process to recover sodium for reuse in the pulping process and to prevent the usual pollution of streams and air caused by the usual effluent from the pulping process. Additionally, the process and apparatus may be utilized for treating concentrated spent liquor from soda-based sulfite pulping processes to recover sulfur and sodium for reuse in the pulping process.

In prior practices of sodium and sulfur recovery from spent liquor, the dilute spent liquor generally is concentrated by evaporation and then burned in a Kraft-type furnace to produce a smelt composed of a mixture of principally sodium carbonate and sodium sulfide. The smelt is subsequently processed by several means to recover the sodium as sodium sulfite either with or without the recovery of sulfur. Examples of processes which recover sodium and sulfur as sodium sulfite from Kraft-type furnace smelts are set forth in U.S. Pat. Nos. 2,792,350; 2,862,887; 2,864,669; 2,849,292 and 3,061,408.

In one embodiment of the process disclosed in the above U. S. Pat. No. 3,061,408, either silica, alumina and silica (Feldspar) or alumina alone as reactants are mixed with the concentrated spent liquor before combusting. In the combusting step, the reactant chosen reacts with the sodium content of the liquor to form either sodium silicate, a mixture of sodium silicate and sodium aluminate, or sodium aluminate, respectively. The sulfur content of the liquor is released into flue gas from the furnace as sulphur dioxide. In the event that the desired reaction does not go to adequate completion during the residence time in the furnace, an auxiliary furnace of the glass-making type is provided to subsequently complete the reactions. The process may work fairly well where silica or silica and alumina (Feldspar) are the reactants since at the normal Kraft-type furnace temperatures of 1800° to 2000° F., the reaction products would be in the molten, fluid state and could be continuously removed from the furnace base by gravity out-flow for subsequent processing as in normal Kraft-type furnace operations.

In the case of alumina, essentially alone as the reactant, the process will not operate satisfactorily as specified in either a glass furnace or a Kraft furnace. This is due to the fact that both the alumina and the sodium aluminate reaction product in this case are solid, refractory finely-divided particulate materials at the usual Kraft and glass furnace temperatures since both have melting points of 3000° F. or more. This being the case with a Kraft furnace, which has a solid bottom, there is no way to continuously remove the particulate product from the furnace by conventional means. Indeed, the product will not accumulate in the furnace bottom as it does with smelt. The reason for this is best understood by reviewing the operation of a Kraft furnace.

In the normal operation of a Kraft-type furnace with concentrated spent liquor, the liquor is sprayed into the secondary air burning zone near the middle of the vertical furnace section where excess combustion of draft air is supplied. The water content is evaporated from the atomized liquor and the liquor solids are charred or partially burned at temperatures of about 1800° F. The charred ash falls to near the furnace bottom to form an ash bed which floats on the molten smelt product. Primary draft air, deficient in oxygen, is continuously blown through the ash bed to reduce sodium compounds to sodium sulfide and sodium carbonate as smelt, which continuously flows out the furnace bottom for subsequent processing. When Kraft spent liquor is processed in the furnace, sodium sulfate as make-up chemical at the rate of about 50 to 150 pounds per ton of pulp produced is mixed in particulate form with the concentrated liquor just before being sprayed into the furnace. This make-up chemical is needed to off-set sodium and sulfur losses which are lost mainly in the flue gas in extremely fine form during the combustion and are partially recoverable at electrostatic precipitators which are designed to treat the flue gas for its recovery.

In the case of combusting spent liquor containing particulate alumina reactant for carrying out the process of the above U.S. Pat. No. 3,061,408, a similar loss of reactant will occur. In addition and much more serious, the primary draft air through the ash bed and the secondary draft air above it will carry what finely-divided particulate sodium aluminate is formed out of the furnace in the flue gas. Thus, as stated above, the process of prior Pat. No. 3,061,408, using alumina as the reactant, is not practical and will not work as specified in a Kraft or glass furnace due to reactant and product loss unless temperatures well over 3000° F. are maintained which is uneconomical in both fuel demand and refractory maintenance costs.

Accordingly, it is the object of the present invention to overcome the above problems and to provide a practical commercial process and apparatus which may be used in mill operations.

In accordance with this invention, it has been discovered that waste liquor treating processes which normally require the use of expensive Kraft-type or glass furnaces and which convert the sodium and sulfur content to a molten "smelt," can be simplified and the process carried out satisfactorily with relatively inexpensive furnace equipment such as a rotary kiln. This discovery is based on reacting the sodium content of the waste liquor, having a solids content of about 25 percent to 70 percent, with alumina or its hydrate in a combustion process to form sodium aluminate and providing a sufficient amount of sodium aluminate to maintain the waste liquor, including organic solids and water, in a solid pellet, non-sticky form. This form is maintained during the drying and combustion process at temperatures below the fusion point of the aluminate (about 3000° F.). The sodium aluminate avoids the usual conversion of the waste liquor inorganic solids into a molten sticky smelt and avoids the necessity of expensive equipment required for handling same.

More specifically, it has been found that the above object may be accomplished by providing a process and apparatus for treating concentrated spent liquor from soda-based pulping processes to recover sodium for reuse in the pulping process and to prevent the usual pollution of streams and air caused by the usual effluent from the pulping process. Basically, the process and apparatus of this invention comprises mixing concentrated spent liquor containing sodium from a soda-based pulping process with recycled finely divided reactive slumina hydrate in an amount necessary to react with the soda content of the liquor for ultimate formation of sodium aluminate as the reaction product. Solid pellets are formed from the concentrated liquor-aluminum hydrate mixture in a rotating enclosed tumbling apparatus carrying a bed of recycled sodium aluminate furnace ash in the bottom thereof by spraying the concentrated liquor-aluminum hydrate mixture onto the bed of ash so that as the tumbling means rotates, solid pellets will be formed. The thus formed solid pellets are combusted and reacted by feeding the pellets through a furnace operating at a temperature below the fusion temperature of sodium aluminate and at a sufficiently high temperature to combust the organic portion of the pellets and react the sodium content thereof with the alumina to form additional sodium aluminate as a particulate unfused ash. The furnace ash is pulverized and a portion thereof is recycled for subsequent reuse in the treatment process. The remaining portion of the ash is dissolved in water to form a solution of sodium aluminate. The sodium aluminate solution in one instance is reacted with sulphur dioxide to form sodium sulfite and alumina hydrate and the alumina hydrate is separated for reuse in the treating process and the sodium sulfite for reuse in the pulping operation.

In obtaining the commercially important features of our process as described above, and particularly the sodium aluminate absorptive carrier material, we employ a molar ratio of $Na_2O$ to $Al_2O_3$ of about $1:1$ to $2:1$. This ratio might be increased in some instances if desired to about $3:1$. In any ratio used, however, it is important to have the alumina present to react with the sodium to the extent that the usual formation of sodium sulfide and sodium carbonate and the formation of a sticky molten smelt is avoided.

Some of the objects and advantages of this invention having been stated, other objects and advantages will appear as the description proceeds, when taken in conjunction with the accompanying drawings in which FIG. 1 is a schematic, diagrammatic flow diagram of the process and apparatus of this invention;

FIG. 2 is a schematic, diagrammatic view of the pellet forming apparatus utilized in this invention;

FIG. 3 is a schematic, diagrammatic view of the absorber apparatus utilized in this invention; and FIG. 4 is an enlarged partial view of a portion of the interior of the absorber apparatus of FIG. 3.

Figure 1:
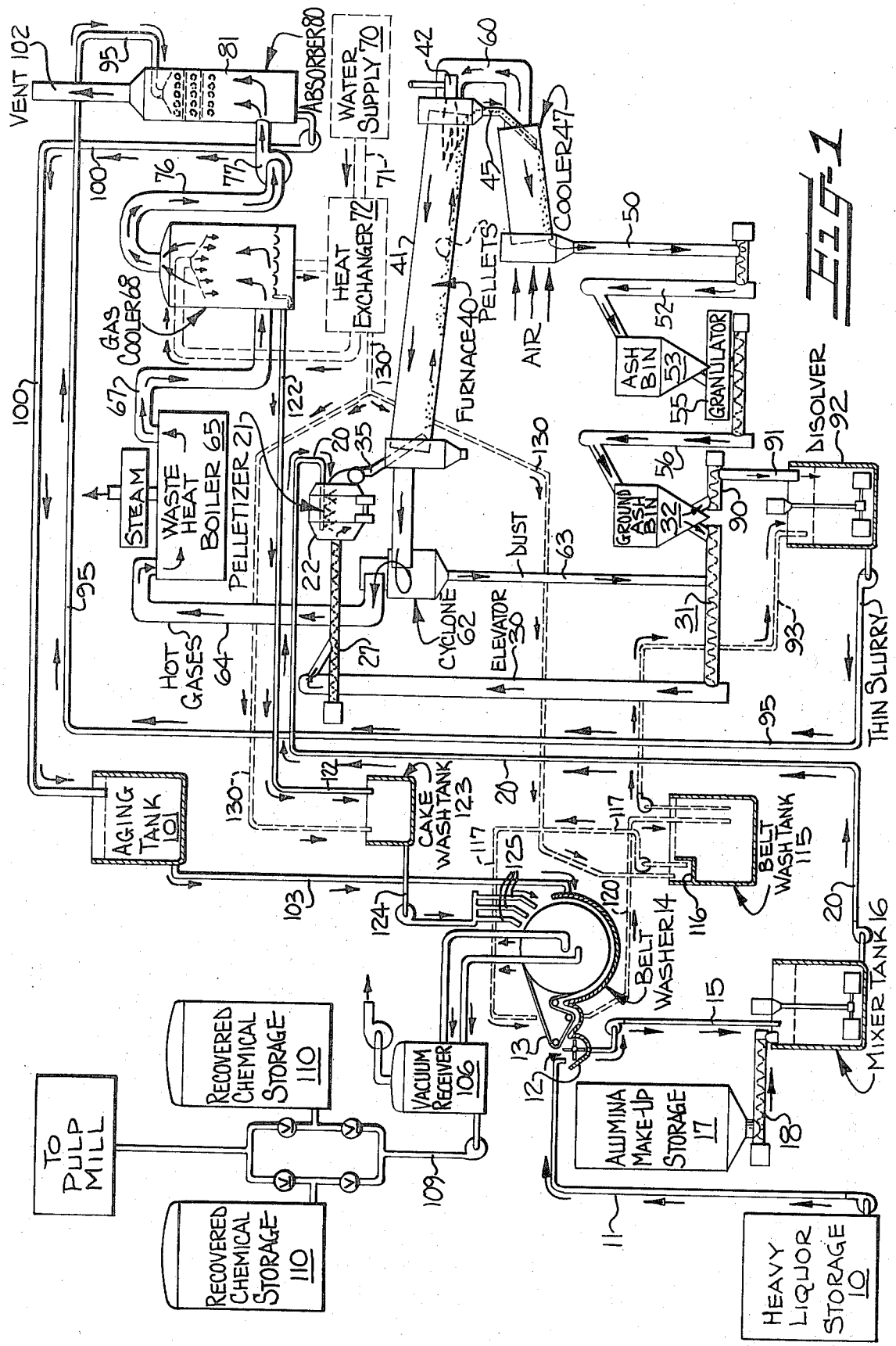

Referring now to the drawings, the following is a general description of the process and apparatus of this invention.

Dilute waste liquor containing sodium from a soda-based pulping operation or pulp plant is concentrated in multiple effect evaporators, not shown, and sent to a heavy liquor storage tank 10. From the heavy liquor storage tank 10, the concentrated liquor is pumped to a repulper 12 through enclosed conduit 11. Alumina cake from the belt 13 of belt washer 14 drops into the repulper 12 and is mixed with the liquor. A description of how the alumina cake is formed in the belt washer 14 will be given below. The resulting slurry is pumped into a mixer tank 16 through conduit 15. In the mixer tank 16, the liquor and alumina are thoroughly mixed and desired alumina make-up is added from the storage tank 17 by screw conveyor 18 so that a sufficient amount of finely-divided reactive alumina hydrate is mixed with the liquor to react with the soda content thereof for the ultimate formation of sodium aluminate as the reaction product.

From the mixing tank 16, the slurry is pumped through conduit 20 into a pelletizer or pellet forming apparatus 21.

The pelletizer 21, as may be seen more particularly in FIG. 2, comprises an enclosed hollow housing 22 which is mounted for rotation on any suitable driving apparatus 23. The conduit 20 extends into and longitudinally through the housing 22 and includes a plurality of spray nozzles 24 or other suitable devices for spraying the concentrated liquor-aluminum hydrate slurry within the housing 22. Connected in non-rotating arrangement with one end of the housing 22 is a screw conveyor 27 which feeds recycled sodium aluminate furnace ash from an elevator 30, screw conveyor 31 and ground ash bin 32 into the bottom of the enclosed housing 22 of the pelletizer 21 to form a bed of recycled sodium aluminate furnace ash in the bottom of the housing 22. As the housing 22 rotates, the mixture of concentrate liquor-aluminum hydrate slurry sprayed therein will be tumbled with the furnace ash resulting in the formation of more or less round, solid pellets.

The pellets so formed may range in size from about one-eighth inch to one inch or more in diameter. The quantity of dry sodium aluminate furnace ash required to form these discrete pellets depends upon the water content of the concentrated liquor used. At 50–60 percent solids equal parts by weight are used. There is an apparent dehydration-hydration reaction between the liquor and the sodium aluminate since considerable heat is involved in the pelletizing step and the pellets are very cohesive and hard in spite of the water content.

In the pellet form, the liquor solids are incapsulated with the alumina reactant within the pellet.

The thus formed pellets are then fed by a chute 35 into one end of a reaction furnace 40 which may be any suitable type of inexpensive and simple furnace, such as a rotary kiln, a multihearth furnace, or a moving grate furnace. In fact any type furnace can be utilized that is equipped to discharge a pelleted ash resulting from combustion from the bottom of the discharge end in the case of a rotary kiln. The furnace preferably operates at a temperature below the fusion temperature of sodium aluminate of about 3000° F. so that the reaction mass does not become plastic or sticky at any stage and preferably at a temperature range between 1500° F. – 2000° F. to combust the organic portion of the pellets and react the sodium content thereof with the alumina to form additional sodium alumina as a particulate unfused ash.

Thus, in the combustion process with sulfite spent liquor, a reducing atmosphere is inherently maintained for carrying out the basic reactions regardless of the combustion conditions outside the pellets, as follows, for example:

$Na_2SO_4 + 2C \rightarrow Na_2S + CO_2$ $Na_2S_2O_3 + CO \rightarrow Na_2S + SO_2 + CO_2$ 4 lignin $SO_3$ Na $\rightarrow Na_2S + Na_2CO_3 + 3H_2S + X CO_2 + X H_2O$ $Na_2S + Al_2O_3 H_2O \rightarrow Na_2O\, Al_2O_3 + H_2S$ $Na_2CO_3 + Al_2O_3 \rightarrow Na_2O\, Al_2O_3 + CO_2$ In the oxidizing atmosphere outside of the pellets, the $H_2S$ is oxidized and driven off as sulfur dioxide ($SO_2$) into the gas stream:

$$H_2S + 1\ \tfrac{1}{2}O_2 \rightarrow SO_2 + H_2O$$

The round pellets retain their form throughout the combustion stage and the collection of the refractory sodium aluminate product as pellets rather than fine ash is simplified and loss in the flue gas is minimized.

The rotary kiln 40 illustrated in FIG. 1 comprises an elongate enclosed chamber 41 which receives the uncombusted pellets at one end thereof from the chute 35 and allows the pellets to flow therethrough by gravity and by rotation of the chamber 41 toward the firing end of the furnace. The firing end of the furnace contains a burner 42 which produces a flame into the chamber 41.

The fully combusted and reacted pellets discharge from the firing end of the furnace 40 down a chute 45 and into an ash cooler 47. Secondary combustion air is drawn from the atmosphere up through the cooler and contacts the burned pellets thus cooling the pellets and preheating the combustion air.

The cooled pellets (250° – 350° F.) pass down a chute 50 into a screw conveyor 51 and flow into an ash bin 53 by a bucket elevator 52. From the ash bin 53, the pellets are fed into a granulator 55 where they are ground to minus 10 mesh and fed by way of a bucket elevator 56 into the ground ash bin 32. As described above, a portion of the thus formed ground sodium aluminate furnace ash is fed from the ground ash bin 32 into the pelletizer 21 for reuse in the treatment process.

Returning to the gas flow through the process and apparatus of this invention, atmospheric air is drawn through the cooler 47 where it cools the pellets and preheats the air. This preheated air flows from the cooler 47 into the furnace 40 by conduit 60 where it joins hot combustion gases from the burner 42 on the lower or firing end of the furnace 40. These hot gases then meet the unreacted and uncombusted pellets flowing counter-currently through the furnace 40 and cause them to combust and react. The hot gases discharge from the input end of the furnace 40 and into a cyclone 62 where laden dust is separated from the gas stream and returned by conduit 63 to the ground ash bin 32 or the screw conveyor 31 leading therefrom.

The hot gases then flow through conduit 64 into a waste heat boiler 65 where they are cooled to approximately 500° F. and at the same time generate steam for use elsewhere in the process and apparatus. The semi-cooled gases then flow through a conduit 67 into a direct contact gas cooler 68. In the gas cooler 68, the gases are contacted with water which flows from a water supply 70, through conduit 71, through heat exchanger 72 and through conduit 73 into the cooler 68. The water is recycled around and around in the gas cooler and exchanges its heat with fresh water in the heat exchanger 72. Gases are discharged from the gas cooler at about 150° F. through conduit 76.

From the conduit 76, the gases pass through induced draft air fan 77, which originally causes atmospheric air to be drawn in through the cooler 47, and into an absorber 80.

The absorber 80 comprises an elongate vertically extending hollow housing 81 having a plurality of grids of spaced-apart, parallel, generally cylindrical bars extending transversely across the housing 81. Alternate grids of bars 82 extend in opposite directions or at 90° angles to each other so as to form venturi-like passages between the bars 82 and a generally checkerboard arrangement of grids of bars 82. These grids of bars 82 are disposed in generally the upper vertical portion of the enclosed housing 81 of the absorber 80.

Referring again to the ground ash bin 32, the remaining portion of the ground sodium aluminate furnace ash is fed by a screw conveyor 90 and conduit 91 into a dissolver or mixer tank 92 where it is slurried or mixed with water entering the dissolver 92 from conduit 93. This thin slurry consists of dissolved sodium aluminate plus any unreacted alumina and other unsoluble materials that may be present in the ash. The thin slurry is pumped through conduit 95 to the top of the absorber 80 where it is allowed to flow down over the grids of bars 82, as shown more particularly in FIG. 3 and 4, to meet the incoming cooled gases coming into the bottom of the absorber. The sodium aluminate reacts with and absorbs sulphur dioxide from the gas stream to form sodium sulfite and alumina in a thick slurry. The thick slurry is pumped from the base of the absorber 80 through conduit 100 into an aging tank 101 and the cleaned air with sulphur dioxide removed is vented to the atmosphere through vents 102 of the absorber 80.

The thick slurry is held in the aging tank 101 for approximately 20-60 minutes allowing the alumina to age and coalesce so that the slurry will be easier to filter. The slurry flows from the aging tank through conduit 103 into the belt washer filter apparatus 14. The belt 13 rotating through the belt washer 14 filters out the alumina hydrate as a dense cake and drops it into the repulper 12 for subsequent reuse in the treatment process. The sodium sulfite solution passes through the belt 13, through conduit 105 and into a vacuum receiver 106. From the vaccum receiver 106, the sodium sulfite solution is pumped into sodium sulfite storage tank 110 through conduit 109 for subsequent use in the pulp mill and the pulping processes.

The belt 13 of the belt washer 14 is continuously backwashed by water from the belt wash tank 115. In the belt wash tank, water for use in back washing the belt 13 is trapped in a trough 116 and is pumped through conduit 117 onto the belt 13. The contaminated water from the lower part of the belt wash tank 115 is pumped to the mixer 92 through 93 for use in making up the thin slurry in mixer 92. This results in recovery of any alumina cake that is back washed from the belt 13. Water from the belt 13 flows into the belt wash tank 115 through conduit 120.

Contaminated water from the gas cooler 68 overflows from the base of the cooler through conduit 122 and into a cake wash tank 123. Water from the cake wash tank 123 is pumped to the sprayers 125 by conduit 124 for spraying water on the belt 13 of the belt washer 14 to completely wash the sodium sulfite solution from the alumina cake. Any dust that is collected in the contaminated water is recovered and added to the cake and the dissolved sulphur dioxide is absorbed by the sodium sulfite solution and is also recovered. Heated water from the heat exchanger 72 is used for supplying hot make-up water through conduit 130 to both the cake wash tank 123 and the belt wash tank 115.

In accordance with the above general description of the process and apparatus of this invention, the following are illustrative, non-limiting, specific examples:

EXAMPLE 1

69,500 pounds per hour of 10% solids spent sulfite liquor is concentrated in suitable multiple effect evaporators to 13,540 pounds per hour of 51% concentrated liquor containing 1,330 pounds of sodium as $Na_2O$ and 313 pounds of sulfur. The concentrated liquor is fed through repulper 12 and mixer 16 where it is intimately mixed with 4,860 pounds per hour of recycled freshing precipitated aluminum hydrate filter cake containing 2,920 pounds per hour of aluminum hydroxide, $Al(OH)_3$. This mixture is fed to pelletizer 21 along with 16,460 pounds per hour of recycled sodium aluminate kiln ash from the ground ash bin 32. In the pelletizer, the recycled ash forms more or less round solid pellets with the concentrated liquor-aluminum hydrate mixture. The pellets are continuously fed from the pelletizer into the direct-fired rotary kiln 40 where the pellets are combusted at a temperature of 1700° to 1800° F. The resulting combustion ash at the rate of 19,900 pounds per hour is cooled in the cooler 47 by the counter-current draft air. 16,460 pounds per hour of the ash is recycled continuously into the granulator 55, through the ash bin 32 and back into the pelletizer 21. 5,800 pounds per hour of the kiln ash is fed to the dissolver mixer 92 where 14,560 pounds per hour of water are added to form a 20 percent solution of sodium aluminate. This solution is fed to the absorber 80. Hot flue gases from the rotary kiln 41 containing water vapor, $SO_2$, $CO_2$, etc., are fed through cyclone 62 where ash fines are precipitated and carried into the conveyor 31 from the ground ash bin 32. From the cyclone 20, the hot gases are carried through waste heat boiler 65 where heat is exchanged with water to generate 15,000 pounds per hour of 150 pounds steam for use in the evaporators. The exit gases from the waste heat boiler 65 at a temperature of 450° – 500° F. are carried through line 25 to the gas cooler 68 where cooling water is introduced. The cooled gases containing 626 pounds per hour of $SO_2$ and a large excess of $CO_2$ are carried into absorber 80 and are brought into countercurrent contact with the sodium aluminate solution to react therewith and form a mixture of 1,200 pounds per hour of sodium sulfite and 1,250 pounds per hour of sodium carbonate in solution and aluminum hydrate is precipitated as a slurry. The slurry is carried to the belt filter washer 14 where filter cake of aluminum hydrate is removed and dropped into the repulper 12. The filtrate containing 1,200 pounds per hour of sodium sulfite, 1,250 pounds per hour of sodium carbonate and a small amount of sodium sulfide is carried to pulp plant chemical storage 110.

EXAMPLE 2

83,000 pounds per hour of 10 percent solids soda pulp black liquor is concentrated in suitable multiple effect evaporators to 14,000 pounds per hour of 60 percent solids black liquor containing 3,000 pounds per hour of spent caustic soda. The concentrated liquor is fed through repulper 12 and mixer tank 16 where it is intimately mixed with 10,000 pounds per hour of freshly precipitated aluminum hydrate filter cake containing 6,000 pounds of aluminum hydroxide $Al(OH)_3$. This mixture is fed to the pelletizer 21 where it is sprayed onto and tumbled with 14,000 pounds per hour of recycled sodium aluminate ash from the ground ash bin 32.

In the pelletizer 21, the recycled ash forms more or less round, solid pellets with the concentrated liquor-aluminum hydrate mixture. The pellets are continuously fed from the pelletizer into a direct-fired rotary kiln 40 where the pellets are combusted at a temperature of about 1800° F. The resulting combustion ash at a rate of 20,200 pounds per hour is cooled in the cooler 47 by counter-current draft air. 14,000 pounds per hour of kiln ash is recycled continuously through the granulator 53 and ground ash bin 32 back into the pelletizer 21. 6,200 pounds per hour of kiln ash is fed through dissolver mixer 92 where water is added to form a 20 percent solution of sodium aluminate. This solution is fed to absorber 80. Hot flue gases from the kiln 40 are exhausted through a cyclone 62 where ash fines are precipitated and can be carried into the dissolver mixer 92 or put in the ground ash recycle screw 31.

From the cyclone 62, the hot gases are carried to and through the waste heat boiler 65 where heat is exchanged with water to generate 23,000 pounds per hour of evaporator processed steam. The exit gases from the boiler 65 at a temperature of 450° – 500° F. are carried to the gas cooler 68 and the cooled gases containing a large excess of $CO_2$ are carried into the absorber 80 and are brought into contact countercurrently with the sodium aluminate solution entering the absorber from the mixer dissolver 92. In the absorber, 4,000 pounds per hour of soda ash ($NA_2CO_3$) in solution are produced and aluminum hydrate is precipitated as a slurry. The slurry is carried through aging tank 101 into the belt washer 14 where the aluminum hydrate filters cake is removed and carried into the repulper 12. The filtrate from the belt washer 14 is fed to storage or chemically processed in any desired manner, such as causticizing, for subsequent use in the mill pulping operation.

EXAMPLE 3

Same as Example 1 except that, if only sodium sulfite is desired as the final pulp chemical product, 380 pounds per hour of elemental sulfur is fed to the rotary kiln 40 for combustion along with the pellets to provide the needed amount of $SO_2$ to react with all of the sodium content of the liquor preferrential to reaction with $CO_2$.

EXAMPLE 4

Same as Example 1, except that the spent sulfite liquor to be processed has been modified to a raffinate resulting from the acidification of concentrated spent NSSC liquor with sulfuric acid stoichiometric to the sodium acetate and formate content followed by solvent extraction of the liberated acetic and formic acids with 2-butanone, as disclosed in U. S. Pat. No. 2,714,118, to form an extract and a raffinate, stripping the 2-finate concentration to 50–60 percent solids prior to mixing with aluminum hydrate and pelletizing with sodium aluminate ash for combustion in the rotary kiln. In this case, the sulfur added to the raffinate by the sulfuric acid used in the acidification provides enough additional to convert essentially all of the sodium content of the spent liquor to sodium sulfite.

Thus, it may be seen that this invention has provided a practical and commercially usuable process and apparatus for treating concentrated spent liquor from a soda-based pulping process to recover sodium for reuse in the pulping process and to prevent the usual pollution of streams and air caused by the usual effluent from the pulping process.

In the drawings and specification, there have been set forth preferred embodiments of the invention, and although specific terms are employed, they are used in a generic and descriptive sense only and not for purposes of limitation.

That which is claimed is:

1. A process for treating concentrated spent liquor from a soda-based pulping process to recover sodium for reuse in the pulping process and to prevent the usual pollution of streams and air caused by the usual effluent from the pulping process; said treating process comprising:

mixing concentrated spent liquor containing sodium from a soda-based pulping process with recycled reactive alumina hydrate in an amount necessary to react with the sodium content of the liquor for the ultimate formation of sodium aluminate as the reaction product;

spraying the concentrated liquor-alumina hydrate mixture onto a bed of recycled sodium aluminate furnace ash and tumbling the mixture and ash to form solid pellets thereof;

combusting and reacting the solid pellets by feeding the pellets through a furnace operating at a temperature below the fusion temperature of sodium aluminate and at a sufficiently high temperature to combust the organic portion of the pellets and react the sodium content thereof with the alumina to form additional sodium aluminate ash;

pulverizing the ash and recycling a portion thereof for subsequent reuse in the formation of pellets;

dissolving the remaining portion of the pulverized ash in water to form a solution of sodium aluminate;

reacting the sodium aluminate solution with sulphur dioxide to form sodium sulfite and alumina; and separating the alumina for reuse in the mixing step and the sodium sulfite for reuse in the pulping process.

2. A process for treating concentrated spent liquor, as set forth in claim 1, in which said combusting step is carried out at temperatures below 3000° F.

3. A process for treating concentrated spent liquor, as set forth in claim 2, in which said combusting step is carried out at temperatures between about 1500° F. to 2000° F.

4. A process for treating concentrated spent liquor, as set forth in claim 1, in which the sodium aluminate has a molar ratio of $Na_2O$ to $Al_2O_3$ of about 1:1 to 2:1.

5. A process for treating concentrated spent liquor, as set forth in claim 1, in which the concentrated spent liquor has a solids content of from about 25% to 70% before mixing with alumina hydrate.

6. A process for treating concentrated spent liquor, as set forth in claim 1, wherein the step of reacting the sodium aluminate solution with sulphur dioxide includes withdrawing gases containing sulphur dioxide from said combusting step and feeding the gases into contact with the sodium aluminate solution.

7. A process for treating concentrated liquor from a soda-base sulfite pulping process to recover sodium for reuse in the pulping process and to prevent the usual pollution of streams and air caused by the usual effluent from the pulping process; said treating process comprising:

mixing concentrated spent liquor containing sodium and sulfur with recycled reactive alumina hydrate in an amount necessary to react with the sodium content of the liquor for the ultimate formation of sodium aluminate as the reaction product;

spraying the concentrated liquor-alumina hydrate mixture onto a bed of recycled sodium aluminate furnace ash and tumbling the mixture and ash to form solid pellets thereof;

combusting and reacting the solid pellets by feeding the pellets through a furnace operating at a temperature below the fusion temperature of sodium aluminate and a sufficiently high temperature to combust the organic portion of the pellets and react the sodium content thereof with the alumina to form additional sodium aluminate as a particulate unfused ash;

pulverizing the ash and recycling a portion thereof for subsequent reuse in the formation of pellets;

dissolving the remaining portion of the pulverized ash in water to form a solution of sodium aluminate;

withdrawing flue gases containing sulphur dioxide and carbon dioxide from the combusting and reacting step and feeding the gases into contact with the sodium aluminate solution;

reacting the sodium aluminate solution with the flue gases containing sulphur dioxide and carbon dioxide to form a mixture of sodium sulfite and sodium carbonate in solution and aluminum hydrate as a slurry;

filtering and separating the aluminum hydrate for reuse in the mixing step and separating the sodium sulfite and sodium carbonate for reuse in the pulping process.

8. An apparatus for treating concentrated spent liquor from a soda-based pulping process to recover sodium for reuse in the pulping process and to prevent the usual pollution of streams and air caused by the usual effluent from the pulping process; said treating apparatus comprising:

means for mixing concentrated spent liquor containing sodium from a soda-based pulping operation with recycled reactive alumina hydrate in an amount necessary to react with the sodium content of the liquor for ultimate formation of sodium aluminate as the reaction product;

means for forming solid pellets from the concentrated liquor-aluminum hydrate mixture comprising a rotating enclosed tumbling means carrying a bed of recycled sodium aluminate furnace ash in the bottom thereof and spray means for spraying the concentrated liquor-aluminum hydrate mixture onto the bed of recycled sodium aluminate furnace ash so that as the tumbling means rotates, solid pellets will be formed;

furnace means for combusting and reacting the solid pellets and including means for feeding the pellets from the pellet forming means to the furnace means, said furnace means operating at a temperature below the fusion temperature of sodium aluminate and at a sufficiently high temperature to combust the organic portion of the pellets and react the sodium content thereof with alumina to form additional sodium aluminate as a particulate unfused ash;

pulverizing means for receiving the ash from said furnace means and for pulverizing the same for subsequent use in the treating process;

means for recycling a portion of the pulverized ash to said pellet forming means for use in the formation of solid pellets therefrom;

means for receiving the remaining portion of the pulverized furnace ash and dissolving the same in water to form a solution of sodium aluminate;

means for receiving the sodium aluminate solution and reacting the same with sulphur dioxide to form sodium sulfite and alumina; and means for separating the alumina for reuse in the mixing means and the sodium sulfite for reuse in the pulping process.

9. The apparatus for treating concentrated spent liquor, as set forth in claim 8, in which said means for receiving the sodium aluminate solution and reacting the same with sulphur dioxide comprises an elongate vertically extending hollow housing, a plurality of grids of spaced apart, parallel, generally cylindrical bars extending transversely across said housing wherein alternate grids of bars extend in opposite directions at 90° angles to each other so as to form venturi-like passages between the bars and a generally checkerboard arrangement of grids of bars so that the sodium aluminate solution may be introduced on top of said grids of bars and flow by gravity flow down through said venturi-like passages for intimate contact with the sulphur dioxide in the form of gases which enter said housing from the bottom thereof and flow counter-currently to the solution.

* * * * *

UNITED STATES PATENT OFFICE
CERTIFICATE OF CORRECTION

Patent No. 3,787,283            Dated January 22, 1974

Inventor(s) Donald R. Sheeley, et al

It is certified that error appears in the above-identified patent and that said Letters Patent are hereby corrected as shown below:

Column 3, line 3, change "slumina to --alumina--;

Column 3, line 38, after "sticky" insert --or--;

Column 8, Line 62, change "finate" to --butanone from the raffinate followed by additional raffinate--;

Column 12, line 1, change "The" to -- An --.

Signed and sealed this 6th day of August 1974.

(SEAL)
Attest:

McCOY M. GIBSON, JR.          C. MARSHALL DANN
Attesting Officer              Commissioner of Patents